(12) United States Patent
Masuya

(10) Patent No.: US 12,386,149 B2
(45) Date of Patent: Aug. 12, 2025

(54) CALIBRATION SAMPLE, MANUFACTURING METHOD FOR CALIBRATION SAMPLE, AND CALIBRATION METHOD FOR AUTOFOCUS TARGET POSITION

(71) Applicant: HITACHI HIGH-TECH CORPORATION, Tokyo (JP)

(72) Inventor: Akira Masuya, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 223 days.

(21) Appl. No.: 18/260,813

(22) PCT Filed: Jan. 27, 2021

(86) PCT No.: PCT/JP2021/002860
§ 371 (c)(1),
(2) Date: Jul. 10, 2023

(87) PCT Pub. No.: WO2022/162791
PCT Pub. Date: Aug. 4, 2022

(65) Prior Publication Data
US 2024/0053581 A1    Feb. 15, 2024

(51) Int. Cl.
*H04N 23/67* (2023.01)
*G02B 7/28* (2021.01)
(Continued)

(52) U.S. Cl.
CPC .............. *G02B 7/28* (2013.01); *G02B 21/241* (2013.01); *G06T 7/80* (2017.01); *H04N 23/67* (2023.01); *G06T 2207/10056* (2013.01)

(58) Field of Classification Search
USPC .......................................................... 348/79
See application file for complete search history.

(56) References Cited

U.S. PATENT DOCUMENTS

2007/0182971 A1    8/2007  Kubo et al.
2008/0203285 A1    8/2008  Sohda et al.
(Continued)

FOREIGN PATENT DOCUMENTS

JP    H10-73414 A    3/1998
JP    2006-275964 A    10/2006
(Continued)

OTHER PUBLICATIONS

International Search Report, mailed Apr. 13, 2021, for International Application No. PCT/JP2021/002860.
(Continued)

*Primary Examiner* — Nigar Chowdhury
(74) *Attorney, Agent, or Firm* — Baker Botts L.L.P.

(57) ABSTRACT

Provided is a calibration sample that can be used for three-dimensional structures and is unlikely to change over time. To this end, the calibration sample is a calibration sample for an autofocus target position in an optical microscope, and comprises a light-transmissive resin sample container that accommodates a first layer, which is disposed on a bottom side along the optical axis direction of the optical microscope and in which a target object having contrast with respect to a light-transmitting first resin is disposed inside the light-transmitting first resin, and a second layer which is disposed so as to cover the first layer and is composed of a light-transmitting second resin.

15 Claims, 9 Drawing Sheets

(51) Int. Cl.
    *G02B 21/24*     (2006.01)
    *G06T 7/80*     (2017.01)

(56) References Cited

U.S. PATENT DOCUMENTS

2019/0025463 A1*   1/2019   She .................... G02B 27/4211
2019/0121058 A1     4/2019   Wakui
2019/0238733 A1*   8/2019   Yashima ................ G02B 7/025

FOREIGN PATENT DOCUMENTS

| | | |
|---|---|---|
| JP | 2007-212243 A | 8/2007 |
| JP | 2008-215824 A | 9/2008 |
| JP | 2013-160815 A | 8/2013 |
| JP | 2018-000102 A | 1/2018 |

OTHER PUBLICATIONS

Written Opinion, mailed Apr. 13, 2021, for International Application No. PCT/JP2021/002860 (without English translation).

* cited by examiner

[FIG. 1A]
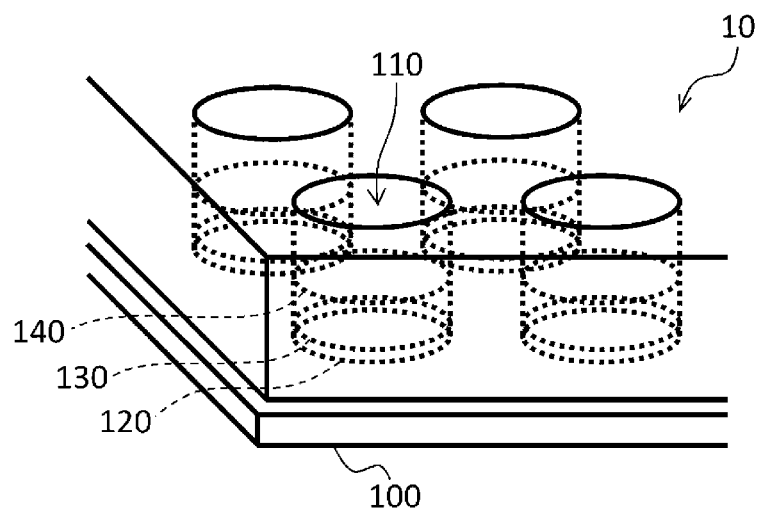
[FIG. 1B]
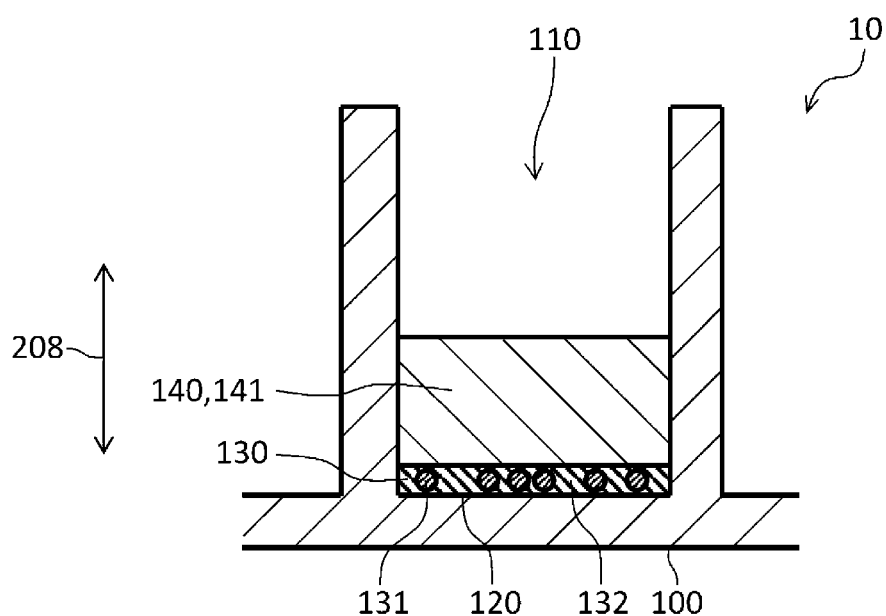

[FIG. 2A]
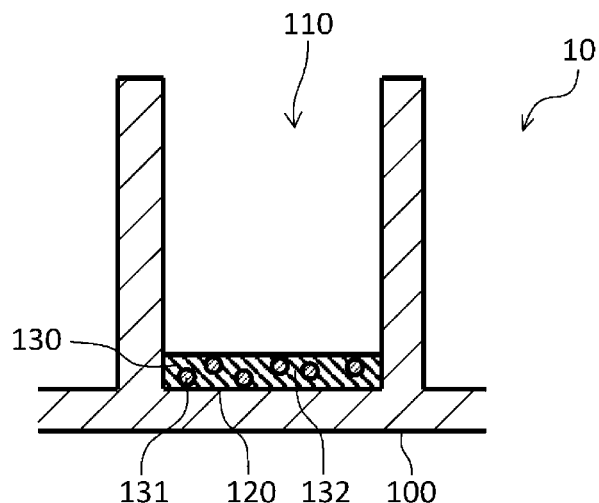
[FIG. 2B]
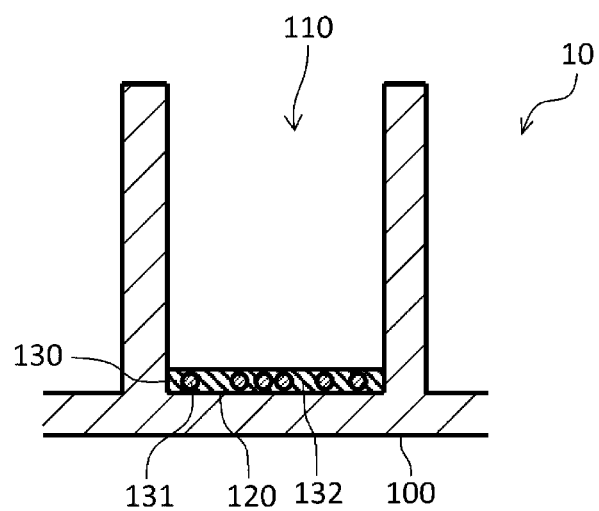
[FIG. 2C]
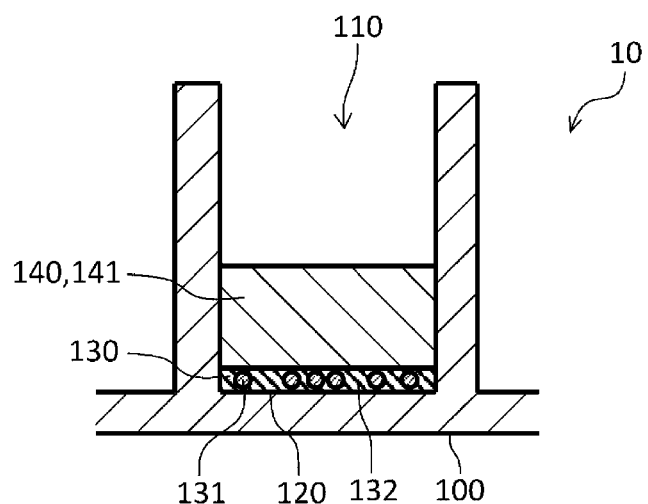

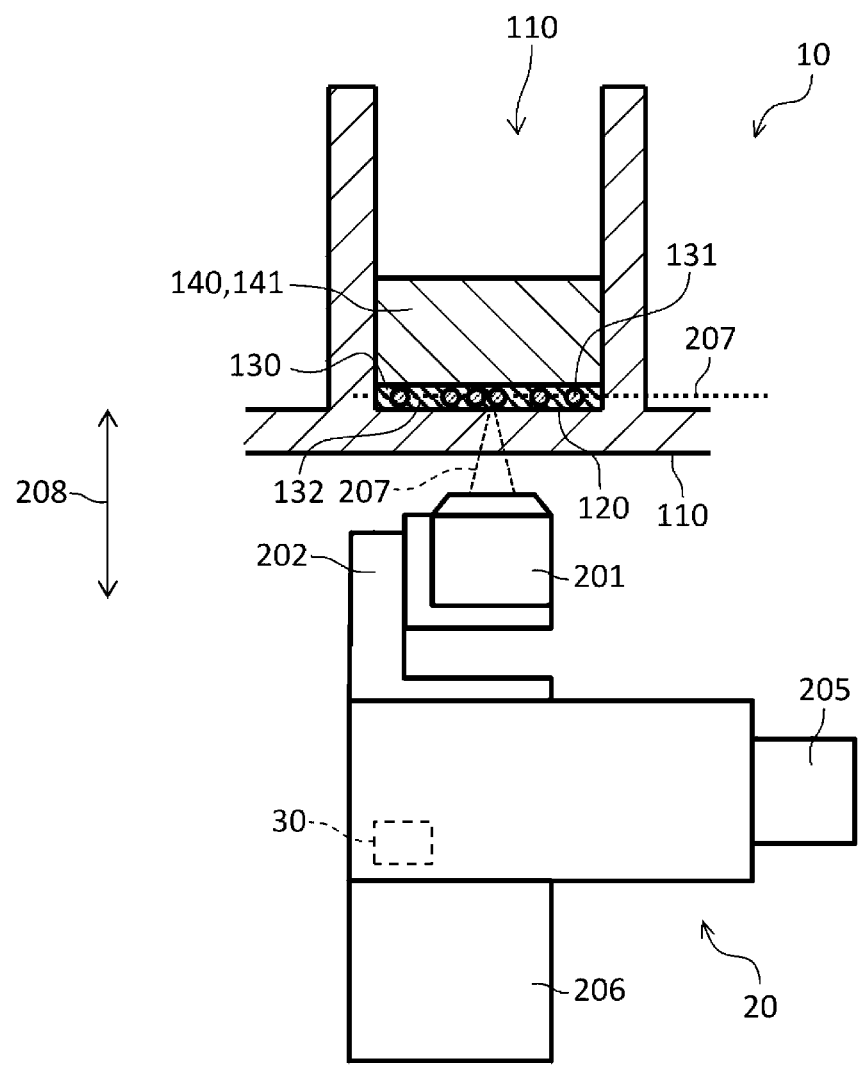
[FIG. 3A]

[FIG. 3B]
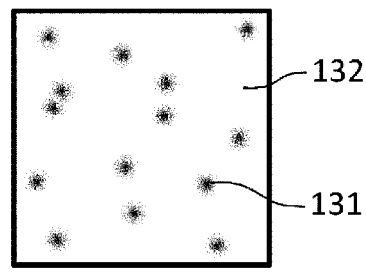
[FIG. 3C]
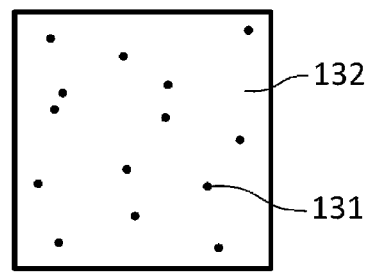
[FIG. 3D]
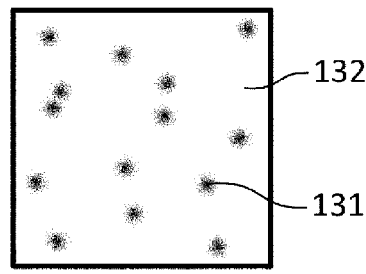
[FIG. 3E]
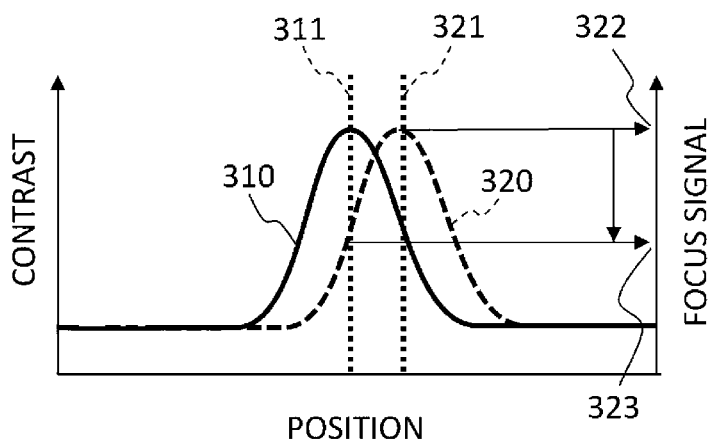

[FIG. 4A]
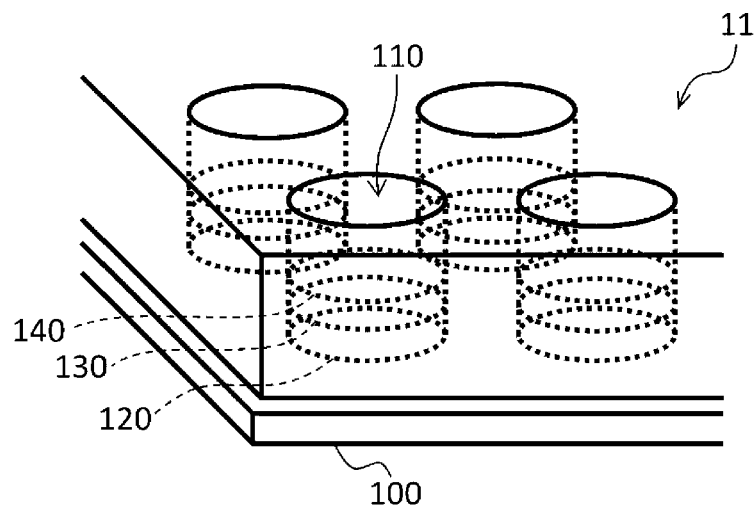
[FIG. 4B]
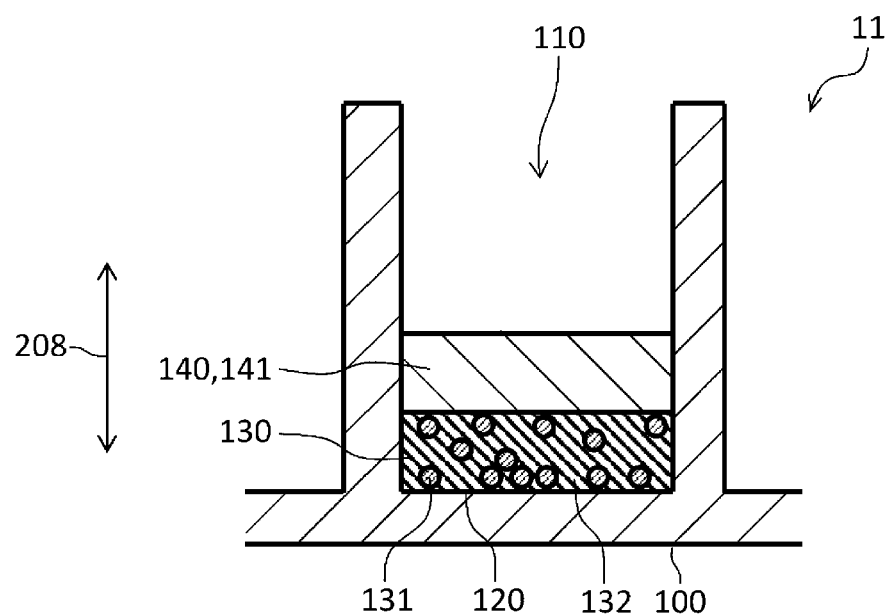

[FIG. 5A]
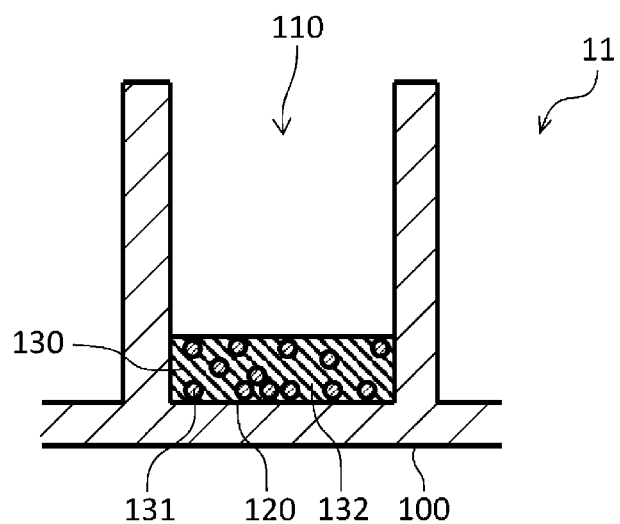
[FIG. 5B]
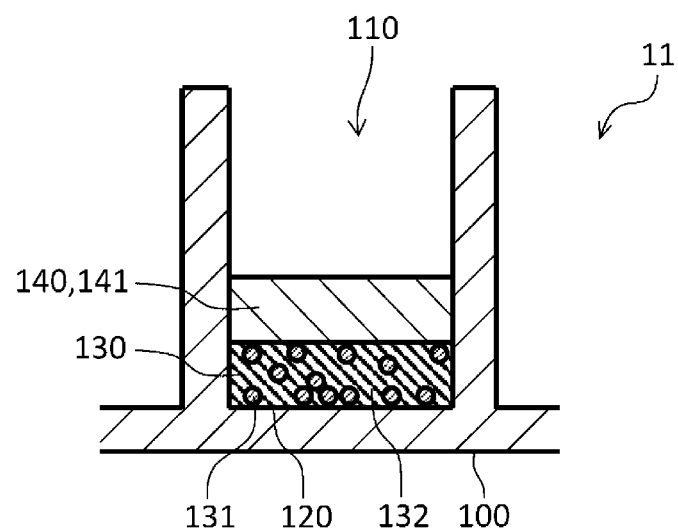

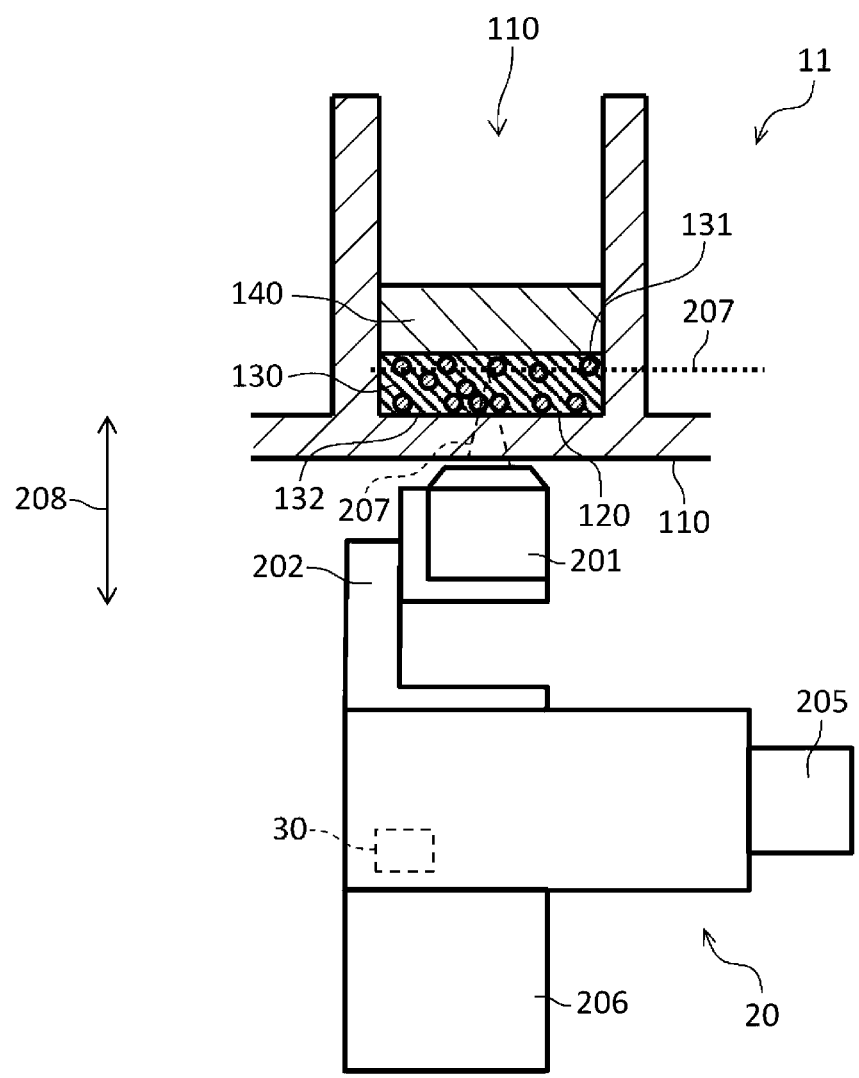
[FIG. 6A]

[FIG. 6B]
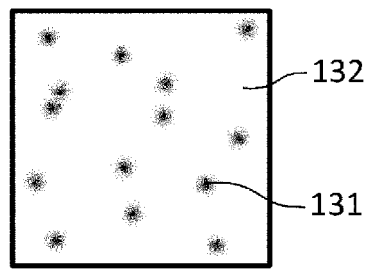
[FIG. 6C]
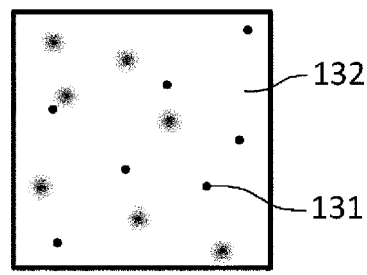
[FIG. 6D]
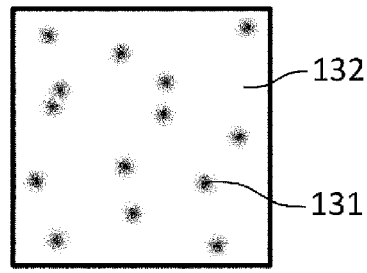
[FIG. 6E]
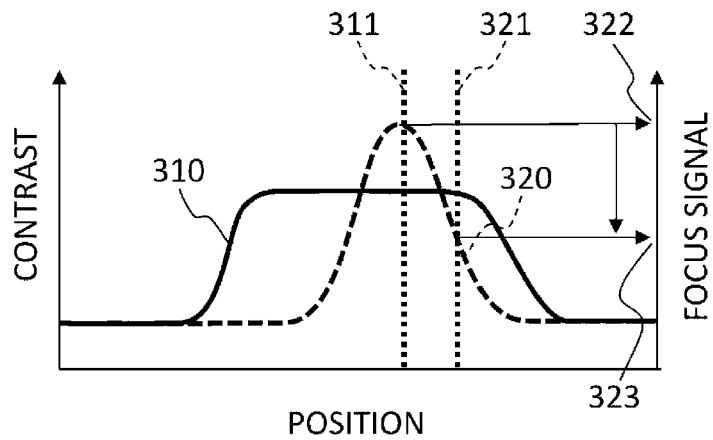

[FIG. 7A]
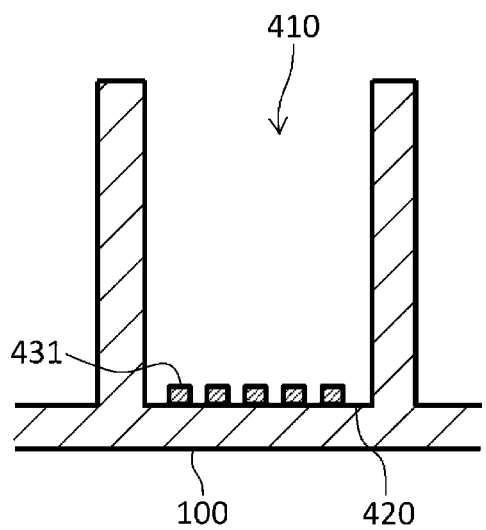
[FIG. 7B]
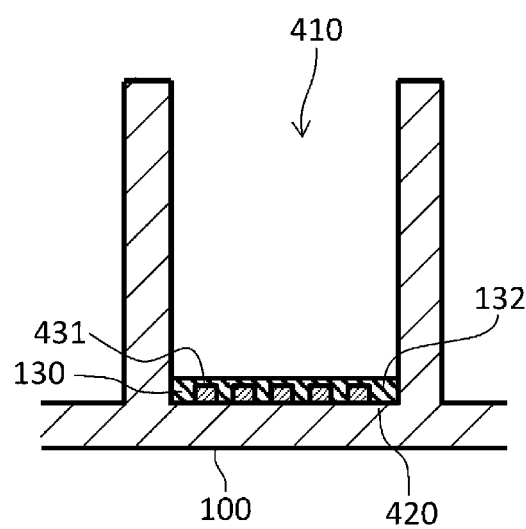
[FIG. 7C]
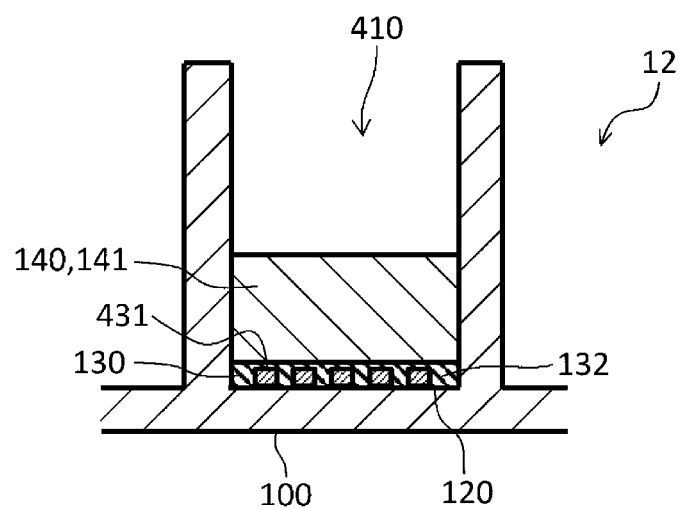

CALIBRATION SAMPLE, MANUFACTURING METHOD FOR CALIBRATION SAMPLE, AND CALIBRATION METHOD FOR AUTOFOCUS TARGET POSITION

TECHNICAL FIELD

The present invention relates to a calibration sample, a calibration sample manufacturing method, and an autofocus target position calibration method.

BACKGROUND ART

Nowadays, attention is focusing on an autofocus function in optical microscopes. The autofocus function is to, for example, move the positions of an objective lens and a sample and perform fixing at a position where the contrast of an imaging target object is maximized. Image identification method and optical method are two main types of methods of the autofocus function. The image identification method is to calculate the contrast of a captured microscopic image and perform fixing to objective lens and sample positions with the highest contrast. The optical method is to irradiate the bottom surface of a sample container with light (for example, laser) by an optical system separate from an optical system for microscopic imaging and fix an objective lens and a sample at a position where the reflected light is most focused.

By the image identification method as compared with the optical method, the contrast of an image captured with an optical microscope is directly confirmed, and thus a microscopic image with the highest contrast can be captured. However, in the case of a biological sample that grows over time and changes object quantity, the biological sample may be small in quantity and contrast required for autofocus may not be obtained in the initial growth stage. Here, autofocus by the image identification method is difficult. By contrast, by the optical method, the position of the bottom surface of a sample container is detected with an optical system separate from an image captured with an optical microscope, and thus autofocus can be performed regardless of the biological sample quantity and even when no contrast can be obtained. However, by the optical method, the contrast of the image captured with the optical microscope is not confirmed directly. Therefore, objective lens and sample positions are fixed at a position where an optical system separate from an optical system for microscopic imaging is focused and calibration is performed to a position where the contrast of the image captured with the optical microscope is maximized.

According to the description of PTL 1, "A microscope condenses light from a sample placed on a stage with an objective lens and captures an image of the sample based on the condensed light to generate image data for observation and includes a control unit to perform autofocus for automatic sample image focusing using an auto-exposure target value determined depending on the sample type and/or operating mode of the microscope".

CITATION LIST

Patent Literature

PTL 1: JP2013-160815A (abstract in particular)

SUMMARY OF INVENTION

Technical Problem

Autofocus target position calibration is performed such that, for example, a target position of objective lens feedback control performed by autofocus matches a position where the maximum contrast of an imaging target object is obtained. Specifically, for example, the target position of the position of the objective lens is changed. The autofocus target position is calibrated each time an automatic imaging sequence (for example, time-lapse imaging) is started. For example, the position of maximum contrast can be set to the autofocus target position.

A biological sample such as a culture solution may contain a solvent with an imaging target floating in the solvent. Here, the biological sample has a three-dimensional structure, and thus necessary measurement information may not be obtained at the position of maximum contrast. Accordingly, when a biological sample to be observed has a three-dimensional structure, an observer confirms a microscopic image of the biological sample and an autofocus target position is calibrated to a position where information can be obtained on the floating observation target object.

FIG. 13 of PTL 1 describes a line-and-space sample in which a metal pattern on the surface of a glass base material is formed by vapor deposition or the like. When using a three-dimensional structure-less (sufficiently thin) sample as in PTL 1 in optically performing autofocus target position calibration, it is impossible to confirm how the actual biological sample looks. Therefore, it is preferable to reconfirm the appearance with the actual biological sample after the calibration. With a sample exposed as in the case of the sample described in PTL 1, optical autofocus is impossible due to a change in reflected light intensity of the optical autofocus. In many cases, a biological sample-containing sample container is a resin-molded article with large variations in optical properties. Therefore, calibration using an actual sample container is preferable.

When calibration is performed using a biological sample, it was impossible to obtain a completely identical microscopic image during recalibration due to a change over time in the biological sample. The biological sample contains a solvent, and thus the solvent evaporates into the atmosphere and the state of the biological sample cannot be maintained for several hours. A completely identical biological sample cannot be made even by biological sample remaking, and a completely identical microscopic image cannot be obtained.

An object of the present disclosure is to provide a calibration sample capable of responding to a three-dimensional structure as well and resistant to change over time, a manufacturing method for a calibration sample, and a calibration method for an autofocus target position.

Solution to Problem

A calibration sample of the present disclosure is a calibration sample for an autofocus target position in an optical microscope. The calibration sample includes a sample container made of light-transmissive resin and accommodating a first layer disposed on a bottom surface side with a target object having contrast with respect to a first resin disposed in the light-transmissive first resin and a second layer disposed to cover the first layer and configured by a light-transmissive second resin along an optical axis direction of the optical microscope. Other solutions will be described later in the detailed description.

Advantageous Effects of Invention

According to the present disclosure, it is possible to provide a calibration sample capable of responding to a three-dimensional structure as well and resistant to change over time, a manufacturing method for a calibration sample, and a calibration method for an autofocus target position.

BRIEF DESCRIPTION OF DRAWINGS

FIG. 1A is a perspective view illustrating a calibration sample of a first embodiment.

FIG. 1B is a cross-sectional view illustrating the calibration sample of the first embodiment.

FIG. 2A is a process diagram illustrating a method for manufacturing the calibration sample of the first embodiment and is a diagram illustrating a state where a first resin is in a sample holding portion with a target fluid dispersed.

FIG. 2B is a process diagram illustrating the method for manufacturing the calibration sample of the first embodiment and is a diagram illustrating a first layer forming process.

FIG. 2C is a process diagram illustrating the method for manufacturing the calibration sample of the first embodiment and is a diagram illustrating a second layer forming process.

FIG. 3A is a diagram illustrating a method for calibrating an autofocus target position using the calibration sample of the first embodiment.

FIG. 3B is a schematic diagram of a microscopic image in which an in-focus position has deviated from the position of a target object to a bottom side.

FIG. 3C is a schematic diagram illustrating a state where the in-focus position and the position of the target object match and a microscopic image of maximum contrast is obtained.

FIG. 3D is a schematic diagram of a microscopic image in which the in-focus position has deviated far from the bottom.

FIG. 3E is a diagram in which a graph of the contrast of a plurality of microscopic images acquired by scanning an objective lens in an optical axis direction and a graph of a focus signal intensity used for autofocus feedback control are illustrated with respect to the optical axis direction.

FIG. 4A is a perspective view illustrating a calibration sample of a second embodiment.

FIG. 4B is a cross-sectional view illustrating the calibration sample of the second embodiment.

FIG. 5A is a process diagram illustrating a method for manufacturing the calibration sample of the second embodiment and is a diagram illustrating a first layer forming process.

FIG. 5B is a process diagram illustrating the method for manufacturing the calibration sample of the second embodiment and is a diagram illustrating a second layer forming process.

FIG. 6A is a diagram illustrating a method for calibrating an autofocus target position using the calibration sample of the second embodiment.

FIG. 6B is a schematic diagram of a microscopic image at a position where an in-focus position is near the bottom surface of a first layer and out of focus with a target object.

FIG. 6C is a schematic diagram of a microscopic image when the in-focus position is in the first layer.

FIG. 6D is a schematic diagram of a microscopic image at a position where the in-focus position is near the interface between the first layer and a second layer and out of focus with the target object.

FIG. 6E is a diagram in which the graph of the contrast of the plurality of microscopic images acquired by scanning the objective lens in the optical axis direction and the graph of the focus signal intensity used for the autofocus feedback control are illustrated with respect to the optical axis direction.

FIG. 7A is a schematic diagram illustrating a method for manufacturing a calibration sample of a third embodiment and is a diagram illustrating a state where a target object is disposed in a sample container.

FIG. 7B is a process diagram illustrating the method for manufacturing the calibration sample of the third embodiment and is a diagram illustrating a first layer forming process.

FIG. 7C is a process diagram illustrating the method for manufacturing the calibration sample of the third embodiment and is a diagram illustrating a second layer forming process.

DESCRIPTION OF EMBODIMENTS

Hereinafter, modes for carrying out the present disclosure (referred to as embodiments) will be described with reference to the drawings. The present disclosure is not limited to the following one embodiment, and different embodiments can be combined or any modification is possible within a range that does not significantly impair the effects of the present disclosure. The same members are denoted by the same reference numerals with redundant descriptions omitted. Those having the same function have the same name. The contents of the illustration are only schematic and, for convenience of illustration, the actual configurations may be changed within a range that does not significantly impair the effects of the present disclosure or the illustration of some members may be omitted or modified in the drawings.

FIG. 1A is a perspective view illustrating a calibration sample 10 of a first embodiment. The calibration sample 10 is used for autofocus target position calibration in an optical microscope 20 (FIG. 3A). The calibration sample 10 includes a first layer 130, which is disposed on the side of a bottom surface 120 of a sample holding portion 110 (for example, hole), and a second layer 140, which is disposed to cover the first layer 130, along the direction of an optical axis 208 (FIG. 1B).

FIG. 1B is a cross-sectional view illustrating the calibration sample 10 of the first embodiment. As for the first layer 130, target objects 131 having contrast with respect to a first resin 132 are disposed in the light-transmissive first resin 132. Although details will be described later, the target object 131 is an object to be focused during autofocus of the optical microscope 20 (FIG. 3A). By providing the first layer 130, it is possible to simulate a sample container 100 in which a biological sample (for example, culture solution) is accommodated in the sample holding portion 110. As a result, it is possible to simulate a state where a biological sample contains a solvent, and thus it is possible to achieve the same image quality as when a biological sample is observed with an optical microscope.

In the illustrated example, the first layer 130 has, for example, the same thickness as the size of the target object 131 (length in the direction of the optical axis 208) Although the target object 131 is tangible and thus the first layer 130 has a three-dimensional structure in a strict sense, to distinguish from a second embodiment to be described later, it is said that "first layer 130 of the first embodiment does not have a three-dimensional structure".

The second layer 140 is configured by a light-transmissive second resin 141. By providing the second layer 140, it is possible to prevent the upper surface of the first layer 130 (interface between the first layer 130 and air) from reflecting light incident on the first layer 130 from the bottom surface 120 side when the second layer 140 is not provided. As a result, especially when the first layer 130 is thin, interference between reflected light on the upper surface of the first layer 130 and reflected light at the interface between the first layer 130 and the bottom surface 120 can be prevented and autofocus can be performed with ease. Note that the second layer 140 does not include a target object (not illustrated) having contrast with respect to the second resin 141.

The calibration sample 10 includes the sample container 100, which accommodates the first layer 130 and the second layer 140 and is made of light-transmissive resin. As a result, calibration can be performed using the same sample container as the sample container 100 used in observing an observation target sample (not illustrated, for example, biological sample such as culture solution). The sample container 100 has a plurality of the sample holding portions 110 capable of accommodating observation target samples to be observed with the optical microscope 20 (FIG. 3A). Therefore, the first layer 130 and the second layer 140 can be accommodated in some of the sample holding portions 110 and observation target samples can be accommodated in the rest of the sample holding portions 110. The sample container 100 is, for example, a 96-well plate configured by colorless, transparent, and light-transmissive resin.

The first resin 132 is preferably thermosetting resin. By using thermosetting resin, the first layer 130 can be easily cured when the calibration sample 10 is manufactured. When the first layer 130 is manufactured using a solvent during manufacturing, the solvent can be volatilized by heating.

Preferably, when the refractive index of the solvent contained in the observation target sample (not illustrated) observed with the optical microscope 20 (FIG. 3A) is $n_3$, the first resin 132 has, for example, a refractive index of $0.9 \times n_3$ or more and $1.1 \times n_3$ or less, preferably $0.95 \times n_3$ or more and $1.05 \times n_3$ or less. By using resin having such a refractive index, it is possible to simulate a solvent in a biological sample.

For example, when the biological sample contains water as a solvent, the first resin 132 preferably has a refractive index of, for example, 1.20 or more and 1.46 or less, preferably 1.26 or more and 1.40 or less, based on 1.33, which is the refractive index of water. Specific examples include fluorine resin (refractive index 1.29 to 1.35). However, the first resin 132 does not necessarily have to have such a refractive index and does not necessarily have to be thermosetting resin.

The target object 131 has contrast (for example, optical contrast) with respect to the first resin 132 as described above. Although details will be described later, the autofocus target position is calibrated by focusing the optical microscope 20 (FIG. 3A) on the target object 131 via the bottom surface 120.

The target object 131 has, for example, a luminance density different from that of the first resin 132 in an image or video captured with the optical microscope 20. As a result, the target object 131 can be recognized separately from the first resin 132 on the image or video. Specifically, for example, at least one of the refractive index and color of the target object 131 is different from the refractive index or color of the first resin 132. As a result, the behavior of light can be changed between the target object 131 and the first resin 132 and the target object 131 can be recognized separately from the first resin 132.

The target object 131 has, for example, a shape (including size) corresponding to an observation target sample (not illustrated) observed with the optical microscope 20. As a result, the calibration sample 10 that simulates an observation target sample can be made. When the observation target sample is, for example, a culture solution containing bacteria or cells, the target objects 131 can be particles such as spheres and ellipsoids. As for the size, for example, the particle diameter can be approximately 10 micrometers in the case of cells and approximately 1 micrometer in the case of bacteria.

The target objects 131 are, for example, particles dispersed in the first resin 132. As a result, mutual adhesion of the target objects 131 and unintended enlargement of the target object 131 can be prevented. It is preferable that the target objects 131 are uniformly dispersed in the entire first resin 132.

The second resin 141 is light-transmissive and is, for example, UV-curable resin. By using UV-curable resin, thermal effects on the first resin 132 can be prevented.

From the viewpoint of preventing light reflection at the interface between the first layer 130 and the second layer 140, the refractive index of the second layer 140 is preferably close to the refractive index of the first layer 130. Specifically, it is preferable to satisfy the following formula (1) when the refractive index of the resin configuring at least the bottom surface 120 of the sample container 100 (especially the bottom surface 120 of the sample holding portion 110) is $n_0$, the refractive index of the first resin 132 is $n_1$, and the refractive index of the second resin 141 is $n_2$.

[Formula 1]

$$\left(\frac{n_2 - n_1}{n_2 + n_1}\right)^2 \leq \frac{1}{100}\left(\frac{n_1 - n_0}{n_1 + n_0}\right)^2 \qquad \text{Formula (1)}$$

By satisfying the formula (1), the light reflectance at the interface between the first layer 130 and the second layer 140 can be 1% or less of the light reflectance at the interface between the first layer 130 and the bottom surface 120. As a result, reflection of light incident on the first layer 130 from the bottom surface 120 side at the interface between the first layer 130 and the second layer 140 can be prevented. Therefore, reflected light on the bottom surface 120 can be identified with ease and autofocus can be performed with ease.

Preferably, the thickness of the second layer 140 in the direction of the optical axis 208 is, for example, a length at which it is possible to attenuate light incident on the second layer 140 from the first layer 130 and reflected at the interface between the second layer 140 and air. By doing so, reflected light at the interface between the second layer 140 and air can be ignored and autofocus can be performed with ease. Specifically, such a thickness is, for example, 100 micrometers or more, and the upper limit is the thickness at which the upper end of the second layer 140 reaches the upper end (opening) of the sample holding portion 110.

FIG. 2A is a process diagram illustrating a method for manufacturing the calibration sample 10 of the first embodiment and is a diagram illustrating a state where the first resin 132 is in the sample holding portion 110 with the target objects 131 dispersed. The first resin 132 that is mixed with the target objects 131 is applied to the surface of the bottom surface 120 of the sample holding portion 110. The applied first resin 132 is a pre-curing fluid. Therefore, it is preferable to apply the first resin 132 that is yet to be cured with the target objects 131 sufficiently mixed and dispersed in advance.

When there is no three-dimensional structure such as that illustrated in the drawing or when the three-dimensional structure is small (first layer 130 that is thin), it is desirable that the pre-curing fluid of the first layer 130 can be diluted with a volatile solvent. By diluting with a volatile solvent, the solvent can be volatilized by heating or negative pressure after applying the pre-curing fluid of the first layer 130 and the film thickness of the pre-curing fluid of the first layer 130 can be approximately several micrometers.

FIG. 2B is a process diagram illustrating the method for manufacturing the calibration sample 10 of the first embodiment and is a diagram illustrating a first layer forming process. In the first layer forming process illustrated in FIG. 2B, the first layer 130 is formed on the bottom surface 120 inside the sample container 100 made of light-transmissive resin with the target objects 131, which have contrast with respect to the first resin 132, disposed in the light-transmissive first resin 132. When the first resin 132 is, for example, thermosetting resin, the first layer 130 can be formed by curing resulting from heat application. When a solvent is used, volatilization may precede curing. When curing by heating, volatilization and curing may be simultaneous.

FIG. 2C is a process diagram illustrating the method for manufacturing the calibration sample 10 of the first embodiment and is a diagram illustrating a second layer forming process. In the second layer forming process, the second layer 140 configured by the light-transmissive second resin 141 is disposed to cover the first layer 130 along the direction of the optical axis 208 (FIG. 3A) of the optical microscope 20 (FIG. 3A). The second layer 140 can be formed by, for example, applying the pre-curing fluid of the UV-curable resin to the upper surface of the first layer 130 and performing curing by ultraviolet irradiation.

FIG. 3A is a diagram illustrating a method for performing autofocus target position calibration using the calibration sample 10 of the first embodiment. The calibration method illustrated in FIG. 3A is performed in the optical microscope 20.

The optical microscope 20 includes an objective lens 201, an actuator 202 driving the objective lens 201 along the direction of the optical axis 208, an imaging lens (not illustrated) and a camera 205 acquiring a microscopic image from light condensed by the objective lens 201, and an autofocus unit 206. The autofocus unit 206 (first autofocus mechanism) performs optical autofocus based on reflected light resulting from light irradiation.

The autofocus unit 206 includes a light source (not illustrated) such as laser for irradiating the bottom surface 120 and a detection unit (not illustrated) receiving reflected light from the bottom surface 120. The autofocus unit 206 includes a register (not illustrated) recording a target focus signal intensity as a target for autofocus feedback control. The focus signal intensity in the specification is a signal obtained by the detection unit performing reflected light intensity-to-electric signal conversion. The target focus signal intensity in the specification is a target value fed back from the signal intensity.

FIG. 3B is a schematic diagram of a microscopic image in which an in-focus position 207 (FIG. 3A) has deviated from the position of the target object 131 (FIG. 3A) to the bottom surface 120 (FIG. 3A) side. FIG. 3C is a schematic diagram of a state where the in-focus position 207 and the position of the target object 131 match and a microscopic image of maximum contrast is obtained. FIG. 3D is a schematic diagram of a microscopic image in which the in-focus position 207 has deviated far from the bottom surface 120. The images illustrated in FIGS. 3B to 3D are obtained by scanning the objective lens 201 in the direction of the optical axis 208 and acquiring a plurality of microscopic images of the calibration sample 10.

Note that the in-focus position and the autofocus target position in the specification are relative positions from the tip of the objective lens 201. The in-focus position is determined by the positional relationship between the objective lens 201 or imaging lens (not illustrated) and a camera sensor (not illustrated). A clear image is obtained at the position of the camera sensor by placing an object (such as the target object 131) at the in-focus position.

Comparing the microscopic images, the contour of the image of the target object 131 in the microscopic image at the in-focus position 207 of FIG. 3C is clear. In the microscopic images of FIGS. 3B and 3D, the target object 131 is out of the in-focus position 207, and thus the image of the target object 131 in the microscopic image is defocused and the contour is unclear. In general, contrast is used as an index indicating the degree of clarity of the contour.

The optical microscope 20 includes a control device (second autofocus mechanism), which acquires a microscopic image (image or video) and performs image identification-type autofocus based on the contrast in the acquired microscopic image. The control device 30 is configured to include, for example, a central processing unit (CPU, not illustrated), a random access memory (RAM, not illustrated), and a read only memory (ROM, not illustrated). The control device 30 is embodied by a predetermined control program stored in the ROM being loaded into the RAM and executed by the CPU.

In FIG. 3E, a graph 310 of the contrast of the plurality of microscopic images acquired by scanning the objective lens 201 (FIG. 3A) in the direction of the optical axis 208 and a graph 320 of the focus signal intensity used for the autofocus feedback control are illustrated with respect to the direction of the optical axis 208. The horizontal axis indicates positions in the direction of the optical axis 208 (FIG. 3A), the left vertical axis indicates the contrast, and the right vertical axis indicates the focus signal intensity. Note that in the case of optical autofocus, the focus signal intensity may be the intensity of reflected light generated by irradiating the bottom surface 120 with light.

A focus signal intensity 322 usually coincides with a position 311 of maximum contrast. Therefore, a focus target is set at the position of the focus signal intensity 322. However, autofocus may not operate normally due to, for example, manufacturing variations in optical components configuring the optical microscope 20, assembly variations therein, and variations in the sample container 100. Accordingly, the autofocus target position is calibrated and a new autofocus target position is set to a target focus signal intensity 323.

The target focus signal intensity 323 is the focus signal intensity in the graph 320 at the position 311 of maximum contrast. The target focus signal intensity 323 is recorded in the register (not illustrated) of the control device 30 (FIG. 3A). Although the focus signal intensity in the graph 320 becomes the target focus signal intensity 323 at two positions, one can be determined by calculating the position derivative of the focus signal intensity. Note that alternatively, the target focus signal intensity 323 may be set to the maximum focus signal intensity 322. Here, the lens position of the camera 205 (FIG. 3A) or the autofocus unit 206 (FIG. 3A) is adjusted such that a maximum position 321 of the focus signal and the position 311 of maximum contrast match.

The calculations can be executed by, for example, the control device 30 (FIG. 3A, autofocus target position calibration device). Accordingly, the control device 30 receives reflected light signals along the direction of the optical axis 208 (FIG. 3A) of the optical microscope 20 (FIG. 3A) and captures the plurality of microscopic images. Determined as a result is the target focus signal intensity 323 of the reflected light in the autofocus unit 206 (FIG. 3A, first autofocus mechanism) at the maximum contrast by the control device 30 (second autofocus mechanism). Then, the control device 30 sets the position corresponding to the target focus signal intensity 323 as the autofocus target position. When the observation target sample (not illustrated) is observed, the objective lens 201 (FIG. 3A) is controlled by the autofocus unit 206 such that the newly set autofocus target position is reached.

Preferably, considering variations in the optical properties of the individual sample container 100 (FIG. 1A) and the sample holding portion 110 (FIG. 1A), the autofocus target position is calibrated based on the variations. In other words, it is preferable that the control device 30 (FIG. 3A) determines the target focus signal intensity 323 for each of the plurality of calibration samples 10 and performs the setting to the autofocus target position by a statistical method based on the plurality of target focus signal intensities 323. As a result, variations can be reduced and the sample container 100 including the plurality of sample holding portions 110 can be observed with high precision. The set target focus signal intensity 323 is recorded in the register (not illustrated).

Here, the statistical method is, for example, the mean, mode, or median value of the plurality of target focus signal intensities 323. The median value is most preferable. As a result, variations can be reduced to the same extent.

The sample container 100 (FIG. 1A) preferably includes at least five sample holding portions 110 (FIG. 1A) accommodating the first layers 130 (FIG. 1A) and the second layers 140 (FIG. 1A). Note that FIG. 1A illustrates only four sample holding portions 110 accommodating the first layers 130 and the second layers 140 among the plurality of sample holding portions 110 of the sample container 100. The control device 30 (FIG. 3A) preferably uses at least five sample holding portions 110 accommodating the first layers 130 and the second layers 140 as the sample container 100 and sets the respective autofocus target positions. As a result, an increase in autofocus target position setting count is possible and variations can be further reduced.

Especially when the sample container 100 is rectangular in a top view, acquisition of at least five points, including the sample holding portions 110 at the four corners and the sample holding portion 110 in the vicinity of the center, is preferable for efficient calculation of the distribution of variations in the optical properties of the individual sample container 100. Here, the vicinity of the center is, for example, the sample holding portion 110 at the center of gravity (intersection of diagonal lines) of the sample container 100 or the sample holding portion 110 closest to the center of gravity. As a result, the autofocus target position can be set in view of variations in the optical properties of the entire sample container 100.

With the calibration sample 10, it is possible to simulate a three-dimensional structure-less observation target sample, examples of which include a case where an observation target sample (not illustrated, for example, biological sample such as cell) is localized on the bottom surface of the sample container 100.

Using a sample plate (for example, 96-well plate) provided with a plurality of the sample containers 100 entails an inter-well difference attributable to sample plate distortion and an inter-plate difference during molding. Accordingly, by the calibration method according to the present disclosure, it is possible to set a focus target position at, for example, the central position of the above variation and set an optimum focus position at which the maximum contrast can be obtained. Since calibration is performed without using an observation target sample, it is possible to provide the solvent volatilization-free calibration sample 10 resistant to change over time.

FIG. 4A is a perspective view illustrating a calibration sample 11 of the second embodiment. FIG. 4B is a cross-sectional view illustrating the calibration sample 11 of the second embodiment. Although the target objects 131 in FIG. 4B are unevenly distributed for convenience of illustration, it is preferable that the actual target objects 131 are uniformly dispersed in the first resin 132.

Unlike the first embodiment, the second embodiment relates to the calibration sample 10 in which the first layer 130 has a three-dimensional structure. For example, the thickness of the first layer 130 exceeds the size (for example, particle diameter) of the target object 131. In the illustrated example, the thickness of the first layer 130 is approximately three times the size of the target object 131 (approximately three target objects 131 in the direction of the optical axis 208). However, the thickness of the first layer 130 is not limited thereto, and the first embodiment or the second embodiment can be selected depending on, for example, the solvent quantity of the observation target sample.

FIG. 5A is a process diagram illustrating a method for manufacturing the calibration sample 11 of the second embodiment and is a diagram illustrating a first layer forming process. In the second embodiment, the first layer 130 has a thickness and a three-dimensional structure. The thickness of the first layer 130 can be adjusted by, for example, changing the concentration of the first resin 132. For example, the thickness increases as the concentration increases. Meanwhile, the viscosity increases as the concentration increases. Therefore, when the concentration is high, a pre-curing fluid diluted with a solvent may be applied. It is preferable that the solvent is sufficiently volatilized after the application and before curing. Note that the fluid may be applied without using the solvent. Thermosetting resin as an example can be used for the first resin 132 as in the first embodiment.

FIG. 5B is a process diagram illustrating the method for manufacturing the calibration sample 11 of the second embodiment and is a diagram illustrating a second layer forming process. Also in the second embodiment, the second layer forming process (FIG. 2C in the first embodiment) is performed in the same manner as in the first embodiment described above. The second resin 141 is preferably UV-curable resin as in the second embodiment.

FIG. 6A is a diagram illustrating a method for performing autofocus target position calibration using the calibration sample 11 of the second embodiment. Also in the second embodiment related to the calibration sample 11 having a three-dimensional structure, calibration is performed in the same manner as in the first embodiment (FIG. 3A) related to the three-dimensional structure-less calibration sample 10.

FIG. 6B is a schematic diagram of a microscopic image at a position where the in-focus position 207 (FIG. 6A) is near the bottom surface 120 (FIG. 4A) of the first layer 130 (FIG. 4A) and out of focus with the target object 131. FIG. 6C is a schematic diagram of a microscopic image when the in-focus position 207 is in the first layer 130. As described above, the actual target objects 131 are uniformly dispersed in the first layer 130, and thus approximately the same number of target objects 131 are focused in the entire height-direction region of the first layer 130. FIG. 6D is a schematic diagram of a microscopic image at a position where the in-focus position 207 is near the interface between the first layer 130 and the second layer 140 and out of focus with the target object 131. The images illustrated in FIGS. 6B to 6D correspond to the images illustrated in FIGS. 3B to 3D.

In FIG. 6E, the graph 310 of the contrast of the plurality of microscopic images acquired by scanning the objective lens 201 (FIG. 6A) in the direction of the optical axis 208 (FIG. 6A) and the graph 320 of the focus signal intensity used for the autofocus feedback control are illustrated with respect to the direction of the optical axis 208. FIG. 6E is the same as FIG. 3E except that the shape of the graph 310 is different. The target objects 131 are uniformly dispersed in the first layer 130, and approximately the same number of target objects 131 are focused in the entire height-direction region of the first layer 130. Therefore, the graph 310 has a wide part in the height direction (horizontal axis direction).

Also in the second embodiment, the autofocus target position can be calibrated in the same manner as in the first embodiment. In the second embodiment, when the autofocus target position is calibrated to the interface between the first layer 130 and the second layer 140, the control device 30 (FIG. 6A) is capable of setting the focus signal intensity at the contrast attenuation start position 311 as the target focus signal intensity 323.

With the calibration sample 11, it is possible to simulate an observation target sample having a three-dimensional structure, examples of which include the observation target sample being a biological sample or the like and cells or the like being dispersed in a culture solution. Then, by adjusting the volume of the first layer 130, the dispersion width of the target object 131 can be controlled and the height of the three-dimensional structure of the observation target sample can be controlled. As a result, it is possible to respond to an observation target sample having a three-dimensional structure as in the second embodiment as well as a three-dimensional structure-less observation target (calibration sample 10 of the first embodiment).

FIG. 7A is a schematic diagram illustrating a method for manufacturing a calibration sample 12 (FIG. 7C) of a third embodiment and is a diagram illustrating a state where target objects 431 are disposed in the sample container 100. The third embodiment as well as the first embodiment is to simulate, for example, an observation target (not illustrated, for example, biological sample) that has no or almost no three-dimensional structure.

Unlike in the first embodiment, in the third embodiment, the target object 431 is disposed in advance on, for example, a bottom surface 420 of a sample holding portion 410 of the sample container 100. The target object 431 is, for example, a metal pattern disposed on the bottom surface 420 inside the sample container 100 (inside bottom surface). As a result, the target object 431 can be easily disposed at a desired position on the bottom surface 420. The metal pattern can be formed by, for example, metal deposition, lithography, or another molding technique. By changing the thickness of the metal pattern, whether there is a three-dimensional structure can be changed. As for other descriptions related to the target object 431, the above descriptions related to the target object 131 can be similarly applied.

FIG. 7B is a process diagram illustrating the method for manufacturing the calibration sample 12 (FIG. 7C) of the third embodiment and is a diagram illustrating a first layer forming process. The fluid of the first resin 132 that is yet to be cured is applied to cover the target object 431. The first resin 132 to be used is preferably thermosetting resin as in the first embodiment. As a result of post-application curing, the first layer 130 in which the target object 431 is disposed in the first resin 132 is formed.

FIG. 7C is a process diagram illustrating the method for manufacturing the calibration sample 12 (FIG. 7C) of the third embodiment and is a diagram illustrating a second layer forming process. The second layer 140 can be, for example, formed in the same manner as in the first embodiment described above. As in the first embodiment, the second resin 141 is preferably UV-curable resin. Obtained by the above method is the sample container 100 accommodating the second layer 140 and the first layer 130 including the metal pattern disposed on the bottom surface 420 inside the sample container 100 as the target object 431.

Appendices of the present disclosure are as follows.

APPENDIX 1

A device for calibrating an autofocus target position using a calibration sample in an optical microscope including a first autofocus mechanism based on reflected light resulting from light irradiation and a second autofocus mechanism based on contrast in an acquired microscopic image, in which the calibration sample includes a sample container made of light-transmissive resin and accommodating a first layer disposed on a bottom surface side with a target object having contrast with respect to a first resin disposed in the light-transmissive first resin and a second layer disposed to cover the first layer and configured by a light-transmissive second resin along an optical axis direction of the optical microscope, and by receiving a signal of the reflected light and capturing a plurality of the microscopic images along the optical axis direction of the optical microscope, a target focus signal intensity of the reflected light in the first autofocus mechanism when contrast by the second autofocus mechanism is maximized is determined, and a position corresponding to the target focus signal intensity is set to an autofocus target position.

APPENDIX 2

The autofocus target position calibration device according to Appendix 1, in which the target focus signal intensity is determined for each of a plurality of the calibration samples and the setting to the autofocus target position is performed by a statistical method based on the plurality of target focus signal intensities.

APPENDIX 3

The autofocus target position calibration device according to Appendix 2, in which the statistical method is a mean, mode, or median value of the plurality of target focus signal intensities.

APPENDIX 4

The autofocus target position calibration device according to any one of Appendices 1 to 3, in which
the sample container includes at least five sample holding portions accommodating the first and second layers, and
the at least five sample holding portions accommodating the first and second layers are used as the sample container to set the respective autofocus target positions.

REFERENCE SIGNS LIST 10, 11, 12: calibration sample
100: sample container
110, 410: sample holding portion
120, 420: bottom surface
130: first layer
131, 431: target object
132: first resin
140: second layer
141: second resin
20: optical microscope
201: objective lens
202: actuator
205: camera
206: autofocus unit (first autofocus mechanism)
207: in-focus position
208: optical axis
30: control device (second autofocus mechanism, autofocus target position calibration device)
310, 320: graph
311, 313: position
322: focus signal intensity
323: target focus signal intensity

The invention claimed is:

1. A calibration sample for an autofocus target position in an optical microscope, the calibration sample comprising:
a sample container made of light-transmissive resin, the sample container accommodating, along an optical axis direction of the optical microscope,
a first layer disposed on a bottom surface side with a target object having contrast with respect to a first resin disposed in the light-transmissive first resin, and
a second layer disposed to cover the first layer and configured by a light-transmissive second resin along an optical axis direction of the optical microscope.

2. The calibration sample according to claim 1, wherein the following formula (1) is satisfied when
a refractive index of the resin configuring at least the bottom surface of the sample container is $n_0$,
a refractive index of the first resin is $n_1$, and
a refractive index of the second resin is $n_2$

[Formula 1]
$$\left(\frac{n_2 - n_1}{n_2 + n_1}\right)^2 \leq \frac{1}{100}\left(\frac{n_1 - n_0}{n_1 + n_0}\right)^2. \quad \text{Formula (1)}$$

3. The calibration sample according to claim 1, wherein the first resin is thermosetting resin.

4. The calibration sample according to claim 1, wherein the first resin has a refractive index of $0.9 \times n_3$ or more and $1.1 \times n_3$ or less when a refractive index of a solvent contained in an observation target sample observed with the optical microscope is $n_3$.

5. The calibration sample according to claim 1, wherein the second resin is UV-curable resin.

6. The calibration sample according to claim 1, wherein the target object has a luminance density different from that of the first resin in an image or video captured with the optical microscope.

7. The calibration sample according to claim 6, wherein at least one of a refractive index and color of the target object is different from a refractive index or color of the first resin.

8. The calibration sample according to claim 1, wherein the target object has a shape corresponding to an observation target sample observed with the optical microscope.

9. The calibration sample according to claim 1, wherein the target object is particles dispersed in the first resin.

10. The calibration sample according to claim 1, wherein the target object is a metal pattern disposed on an inside bottom surface of the sample container.

11. A manufacturing method for a calibration sample for an autofocus target position in an optical microscope, the calibration sample manufacturing method comprising:
a first layer forming process of forming a first layer on an inside bottom surface of a sample container made of light-transmissive resin with a target object having contrast with respect to a first resin disposed in the light-transmissive first resin; and
a second layer forming process of disposing a second layer configured by a light-transmissive second resin to cover the first layer along an optical axis direction of the optical microscope.

12. A method for calibrating an autofocus target position using a calibration sample in an optical microscope including a first autofocus mechanism based on reflected light resulting from light irradiation and a second autofocus mechanism based on contrast in an acquired microscopic image, wherein
the calibration sample includes a sample container made of light-transmissive resin, the sample container accommodating, along an optical axis direction of the optical microscope,
a first layer disposed on a bottom surface side with a target object having contrast with respect to a first resin disposed in the light-transmissive first resin, and
a second layer disposed to cover the first layer and configured by a light- transmissive second resin, and
by receiving a signal of the reflected light and capturing a plurality of the microscopic images along the optical axis direction of the optical microscope, a target focus signal intensity of the reflected light in the first autofocus mechanism when contrast by the second autofocus mechanism is maximized is determined, and a position corresponding to the target focus signal intensity is set to an autofocus target position.

13. The autofocus target position calibration method according to claim 12, wherein the target focus signal intensity is determined for each of a plurality of the calibration samples and the setting to the autofocus target position is performed by a statistical method based on the plurality of target focus signal intensities.

14. The autofocus target position calibration method according to claim 13, wherein the statistical method is a mean, mode, or median value of the plurality of target focus signal intensities.

15. The autofocus target position calibration method according to claim 12, wherein
the sample container includes at least five sample holding portions accommodating the first and second layers, and
the at least five sample holding portions accommodating the first and second layers are used as the sample container to set the respective autofocus target positions.

\* \* \* \* \*